United States Patent Office 3,226,642
Patented Dec. 28, 1965

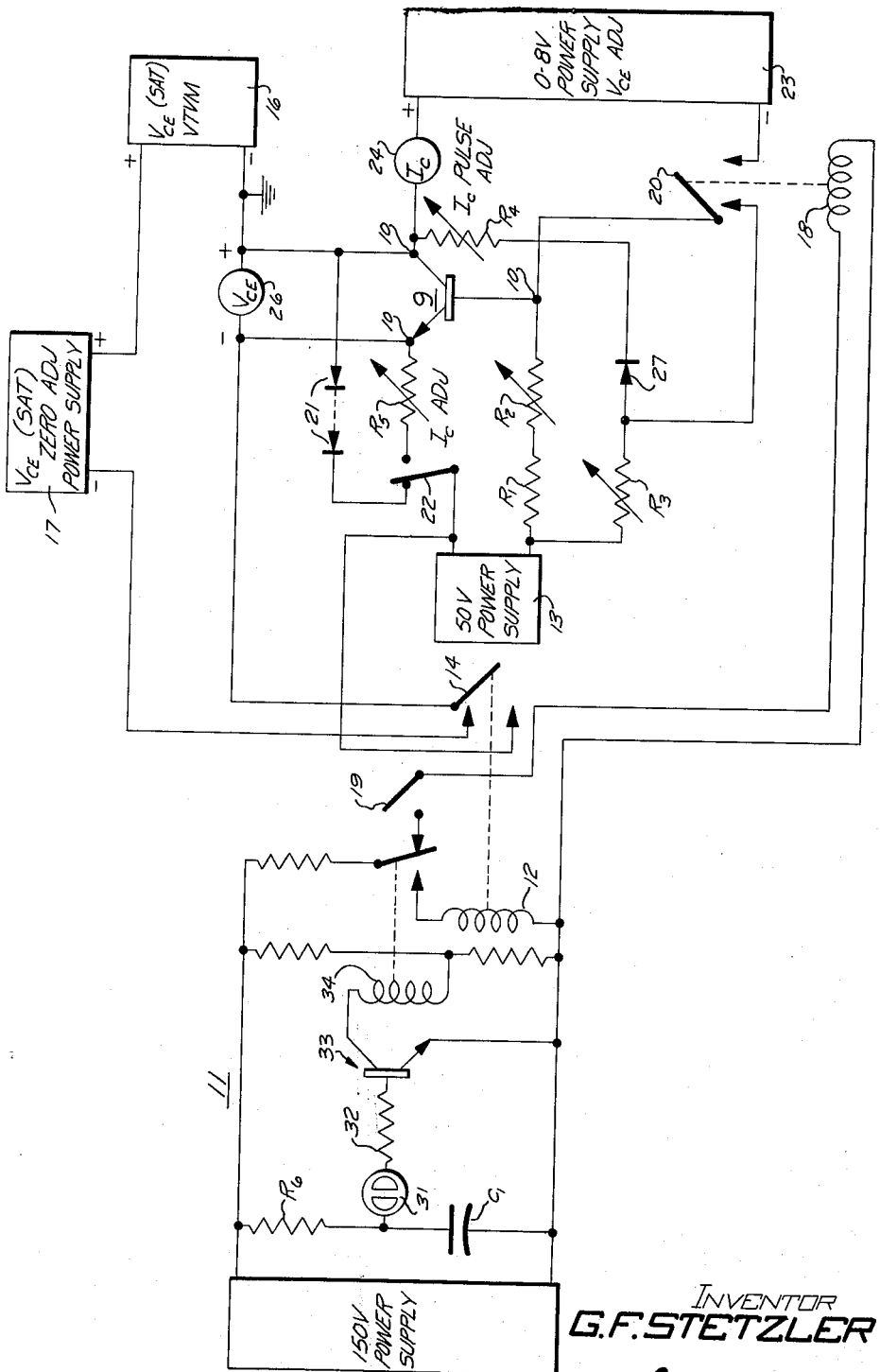

3,226,642
MEASURING THE THERMAL RESISTANCE OF A TRANSISTOR BY ALTERNATELY MEASURING THE CHANGE IN COLLECTOR SATURATION VOLTAGE IN THE COMMON EMITTER MODE AND APPLYING POWER IN THE COMMON BASE MODE
Grant F. Stetzler, Temple, Pa., assignor to Western Electric Company, Incorporated, a corporation of New York
Filed June 9, 1961, Ser. No. 116,014
5 Claims. (Cl. 324—158)

This invention relates to the testing of transistors, and particularly to measuring the thermal resistance of transistors.

One important measurement in the manufacture of transistors is the determination of thermal resistance. A reliable parameter in such determination is the collector saturation voltage. After a transistor has been brought to thermal equilibrium conditions, an operator can obtain from the product of the collector voltage and collector current the power required to raise the collector saturation voltage a specified amount. From calibration curves of collector saturation voltage versus temperature, the rise in the collector saturation voltage can be converted to a rise in temperature. The temperature rise divided by the power dissipated is the thermal resistance of the transistor. The heat dissipating capability of the transistor is, of course, a measure of the amount of power that it will tolerate before the transistor ceases to operate satisfactorily or burns out. While the common emitter mode is highly satisfactory in providing the collector saturation voltage, it has disadvantages from the standpoint of applying power to the transistor under test because the common emitter current gain varies greatly between units and changes with temperature.

Accordingly, an object of this invention is to provide new and improved methods of measuring the thermal resistance of a transistor.

A method illustrating certain features of the invention may include making a first measurement of the collector-emitter saturation voltage, $V_{CE}(SAT)$, while the transistor is connected in the common emitter mode under conditions such that no appreciable power is dissipated in the transistor to raise the temperature thereof. The change in $V_{CE}(SAT)$ in the common emitter mode is then measured, while alternately placing the transistor in the common emitter mode under conditions of essentially no power dissipation, and applying power to the transistor in the common base mode.

The invention will be more readily understood from the detailed description which follows when read in conjunction with the single appended drawing which schematically illustrates a circuit for practicing the invention.

Since the thermal resistance of a transistor 9 connected to test terminals 10 is determined by measuring the change in collector saturation voltage caused by a measured amount of power being dissipated in the transistor under test, two junction temperature conditions for the collector saturation voltage $V_{CE}(SAT)$ are required. The first, or reference, condition requires measuring $V_{CE}(SAT)$ with no appreciable power dissipated in the transistor under test, that is, the junction and case are at the same temperature. Since the $V_{CE}(SAT)$ measuring bias will, in itself, heat the junction, it is necessary to make the measurements on a pulsed basis. In order to accomplish this, the oscillator 11 operates relay 12 for about 5 milliseconds of a total time cycle of 150 milliseconds. During the resultant 3 percent of the cycle that relay 12 is energized, the emitter is connected to the 50 volt power supply 13 through the operated contact 14. This supply, applied through series resistors $R_1$, $R_2$, provides a constant base current of 75 ma., and with series resistors $R_3$ and $R_4$, a constant collector current of 750 ma. Operated contact 14 also connects a peak reading voltmeter 16 to the emitter to read the resultant $V_{CE}(SAT)$ voltage. The collector and one side of the meter 16 are always at ground potential. Since the test embodies only the change in $V_{CE}(SAT)$, rather than its absolute value, a bucking power supply 17 is provided for setting the initial reading at a convenient meter reference point. Diodes 21 provide a clamping circuit of approximately 4 volts to prevent the collector from floating up to 50 volts during the 97 percent off-time.

It is important to note that during the reference temperature measurement, no power is applied during approximately 97 percent of the total time cycle. A relay 18 for the common base mode is not effective at this time, since test switch 19 is open, and hence, contact 20 of relay 18 remains open. When the test switches 19 and 22 are operated, relay 18 is periodically energized for the 97 percent time interval and the higher junction temperature condition is initiated. As before, the voltmeter 16 furnishes a reading of the 3 percent duty portion of the time cycle in the common emitter mode. However, during the remaining 97 percent of the time cycle, power is applied in the common base mode, due to the operation of relay 18. The test switch 22 connects the emitter through resistor $R_5$ to one side of the 50 volt power supply 13, and relay 18 when energized connects the base through resistor $R_3$, shunted by resistors $R_1$ and $R_2$, to the other side of the supply. In the common base mode, the power supply 13 and series resistors provide a constant emitter current of such magnitude that a constant collector current $I_C$ of a convenient value, such as, 1 amp. results. In the common base configuration, the current gain is slightly less than unity, and substantially the same from unit to unit.

Additionally, relay 18 when operated, connects a 0–8 v. constant voltage supply 23 between the base and the collector of transistor 9 to provide a reverse bias for the base-collector junction, a diode 27 preventing shunt current flow through resistor $R_4$. It will be recalled from above that the collector current $I_C$, as indicated by the average reading ammeter 24, had previously been set at 1 amp.; accordingly, since the power dissipated in the transistor 9 is the product of $V_{CE}$ and $I_C$, the $V_{CE}$ reading on the average reading voltmeter 26 indicates the dissipated power directly. The reading of voltmeter 16, of course, indicates the change in $V_{CE}(SAT)$. To determine the thermal resistance of the transistor 9 for a given amount of power dissipation, the supply 23 is varied until a prescribed amount of power, as indicated by the reading of $V_{CE}$ on meter 26, is dissipated in the transistor. The reading of meter 16 at this time is then noted to ascertain the resultant change in $V_{CE}(SAT)$. To determine the thermal resistance of the transistor 9 for a given change in $V_{CE}(SAT)$, the supply 23 is varied until a specified change in $V_{CE}(SAT)$ is reached, and $V_{CE}$ then measured to ascertain the power required to bring about this change.

The oscillator for obtaining the foregoing 3 percent duty time and 97 percent off or power time, is of the transistorized neon type. The circuit includes a .2 mfd. capacitor $C_1$ which charges through a 2.2 megohm resistor $R_6$. When the firing potential of the neon tube 31 is reached, the capacitor discharges through that tube, the 2400 ohm resistor 32 and the base emitter of transistor 33. The resultant current flow is amplified by the transistor to energize relay 34. When the voltage on the capacitor $C_1$ falls below the sustaining voltage for the tube, the relay 34 de-energizes. When relay 34 is energized, relay 18 becomes de-energized and relay 12 becomes energized. The charging time of the capacitor is made much longer than the discharging time. Specifically, in the present case, the on-time for relay 34 and, hence, relay 12, is approximately 3 percent. Relays 12, 18 and 34 are preferably of the mercury wetted type to prevent contact bounce.

While the circuit shown is designed for testing NPN transistors, a suitable switching arrangement may be used so that the circuit may test either NPN or PNP transistors. Test terminals 10 may be considered as part of a suitable receptacle or socket for receiving transistors.

Preferably, the transistor remains in the common emitter mode for approximately 3 percent of the time or even less. The operating time in the common emitter mode may be higher but should not exceed 15 percent.

Various changes may be made without departing from the spirit of the invention.

What is claimed is:

1. In a method of measuring the thermal resistance of a transistor, the steps of:
    (a) applying a predetermined bias to the transistor in the common emitter mode in a manner such that the temperature of the transistor does not increase appreciably;
    (b) measuring the collector-emitter saturation voltage in the common emitter mode during step (a);
    (c) alternately applying the predetermined bias to the transistor in the common emitter mode and applying power to the transistor in the common base mode for respective time intervals such that essentially only the power supplied to the transistor in the common base mode increases the temperature thereof;
    (d) measuring the change in collector-emitter saturation voltage in the common emitter mode from that obtained in step (b); and
    (e) measuring the power supplied to the transistor in the common base mode.

2. A method according to claim 1 wherein step (a) is accomplished by intermittently applying the predetermined bias.

3. A method according to claim 1 wherein the transistor during step (c) is in the common emitter mode less than 15% of the total time and in the common base mode for the remainder of the time.

4. A method according to claim 1 wherein the transistor is in the common emitter mode for approximately 3% of the total time.

5. A method according to claim 1 wherein the power supplied to the transistor in the common base mode is adjusted to a predetermined value.

References Cited by the Examiner

UNITED STATES PATENTS

| | | | |
|---|---|---|---|
| 2,872,644 | 2/1959 | Reich | 324—158 |
| 2,953,748 | 9/1960 | Lemson et al. | 324—158 |
| 2,982,916 | 5/1961 | Loesch | 324—158 |
| 3,082,374 | 3/1963 | Buuck | 324—73 |

OTHER REFERENCES

IBM Technical Disclosure Bulletin, volume 2, No. 6, April 1960, page 77.

Motorola Power Transistor Handbook, 1st Edition, Copyright 1961, pages 163–164.

WALTER L. CARLSON, *Primary Examiner.*

SAMUEL BERNSTEIN, *Examiner.*